(12) United States Patent
Murray

(10) Patent No.: US 6,388,666 B1
(45) Date of Patent: May 14, 2002

(54) SYSTEM AND METHOD FOR GENERATING STEREOSCOPIC IMAGE DATA

(75) Inventor: Hugh Murray, Mississauga (CA)

(73) Assignee: Imax Corporation, Mississauga (CA)

( * ) Notice: Subject to any disclaimer, the term of this patent is extended or adjusted under 35 U.S.C. 154(b) by 0 days.

(21) Appl. No.: 09/179,716

(22) Filed: Oct. 27, 1998

(51) Int. Cl.$^7$ ............................................... G06T 15/70
(52) U.S. Cl. ...................................... 345/473; 345/419
(58) Field of Search ................................ 345/473, 419, 345/156; 382/154; 709/231; 359/557; 348/43

(56) References Cited

U.S. PATENT DOCUMENTS

| | | | | |
|---|---|---|---|---|
| 5,852,672 A | * | 12/1998 | Lu | 382/154 |
| 5,929,859 A | * | 7/1999 | Meijers | 345/419 |
| 5,953,506 A | * | 9/1999 | Kalra et al. | 395/200.61 |
| 5,982,352 A | * | 11/1999 | Pryor | 345/156 |
| 6,031,564 A | * | 2/2000 | Ma et al. | 348/43 |
| 6,031,934 A | * | 2/2000 | Ahmad | 382/154 |
| 6,067,194 A | * | 5/2000 | Stroemberg | 359/557 |

OTHER PUBLICATIONS

Tutorial: Time—Multiplexed Stereoscopic Computer Graphics, IEEE Computer Graphics & Applications, Hodges, Larry F., Mar. 1992, pp. 20 to 30.
Chapter 4, Viewing Model, undated, pp. 59 to 77.
Computing Stereoscopic Views—Chapter 5 in Stereo Computer Graphics and other True 3D Technologies ed. by David F. McAllister, Princeton University Press, 1993, pp. 71 to 89.
Stereoscopic computer graphics tutorial—at http://www.qualixdirect.com, undated.
Power Animator, V8, Alias (a Silicon Graphics Company), Rendering In Alias, 1996, pp. 304 & 305.

* cited by examiner

*Primary Examiner*—Cliff N. Vo
*Assistant Examiner*—Huedung X. Cao
(74) *Attorney, Agent, or Firm*—Bereskin & Parr

(57) ABSTRACT

A system and corresponding method for generating stereoscopic image from modelling data and camera animation curve data created in the process of creating a computer graphics animation sequence intended for 2D display. The system comprises a database in which the modelling data and the original camera animation curve data are stored, as well as a stereoscopic camera animation curve data generator and an animation sequence renderer. The stereoscopic camera animation curve data generator inputs the original camera animation curve data and generates stereoscopic camera animation curve data for at least one stereoscopic camera which is fixed in position and alignment with respect to another stereoscopic camera (which may be the original camera used to generate the original computer graphics animation sequence). The renderer inputs the stereoscopic camera animation curve data and the modelling data and generates stereoscopic image data.

17 Claims, 12 Drawing Sheets

| | | | |
|---|---|---|---|
| 410 | MODELLING UNITS | CAMERA FIELD OF VIEW ( ° ) | | 412 |
| | | CAMERA SEPARATION | | 414 |
| | | CONVERGENCE DISTANCE | | 416 |
| | | PRIME SUBJECT DISTANCE | | 418 |
| | | SUBJECT SIZE | | 420 |
| | | FAR SUBJECT DISTANCE | | 422 |
| | THEATRE UNITS | SUBJECT THEATRE DISTANCE (m) | | 424 |
| | | SUBJECT THEATRE SIZE (m) | | 426 |
| | | | $P_{div}$ | 428 |
| | | FAR SUBJECT FRONT ROW DIVERGENCE ANGLE | | 430 |

Fig. 6

SYSTEM AND METHOD FOR GENERATING STEREOSCOPIC IMAGE DATA

FIELD OF THE INVENTION

This invention relates to the field of computer graphics animation, and in particular, to stereoscopic image generation.

BACKGROUND OF THE INVENTION

The recent surge in the quantity and quality of computer graphics animation for two dimensional (2D) or "monoscopic" media presentation such as film or video, is largely attributable to the continued increase of computer processing power, coupled with the constant evolution of computer graphics animation techniques.

Typically, such animation involves the development of three dimensional (3D) modelling constructs in artificial computer space. The sets and props (including landscapes, buildings, trees, vehicles, furniture, etc.) as well as the characters are modelled three dimensionally in computer (or virtual) space having a 3D coordinate system, and stored as modelling data. The modelling constructs are usually collections of geometric surfaces built from mathematical primitives. The movement and modification of the characters and props is also stored and manipulated by the computer as a series of data paths correlated to time and 3D space commonly referred to as "animation curves".

The succession of two dimensional (2D) views of the animated sequence that become the frames in the film or video display, are usually defined by placing a viewpoint in the scene in the artificial computer space that "looks" in a certain direction, with a defined field of view (which may be stored as camera characteristic data). This point of view has many of the characteristics of a real world camera and lens, and its placement and movement within the modelled scene is analogous to the use of the camera on a real world move location. Unless expressly indicated otherwise, reference to a "camera" in this specification including the claims, refers to this form of simulated camera used in artificial computer space.

It should be understood that when used in this specification including the claims, the term "animation sequence" may include one or more animation sequences which have been joined together.

Animation curve data is also generated and stored with respect to the desired movement and manipulation of the simulated camera. The camera's animation curve data is synchronized with the various animation curves used to move and manipulate the various characters and props, in order for the camera to be able to view the animated action. Through a complicated series of computations called "rendering", the computer then calculates the view for each frame to approximate what a real world camera would "see" if it was positioned and provided with characteristics similar to the simulated camera and if the modelling constructs were actually solid objects in the real world.

When the animation sequence is complete, the data generated (and typically stored) by the animation process includes the modelling data and the related modelling animation curve data, data relating to the characteristics of the camera, such as field of view, aspect ratio, resolution and horizon position, as well as the camera animation curve data, and the rendered 2D computer graphics animation images which form the animation sequence. As a result, the modelling data and related animation curve data and the camera characteristics data and camera animation curve data may be remanipulated so that a different animation sequence may be rendered.

It should be understood that when used in this specification including the claims, the term "horizon position" refers to the vertical offset which may be applied to change the normal horizon position in the image. For large format theatres, typically a vertically off-centred lens is used to change the normal horizon position which is typically in the vertical centre of the image.

Less common, but still relatively well-known, is the ability to generate a simulated 3D or "stereoscopic" image by combining two 2D images in left and a right image) of the same scene, each from a slightly different perspective. Typically, both 2D images are presented simultaneously (or in sufficiently rapid alternation to appear to be presented simultaneously) on the same 2D medium, such as a film or TV screen. Through one of several different known techniques, such as the use of filtered or shuttered lenses or head-mounted display devices containing a miniature video screen for each eye, the left image is restricted so that it is viewed solely by the left eye, and the right image is restricted so that it is viewed solely by the right eye. These techniques simulate the visual process by which a person sees three dimensionally in the real world.

Although stereoscopic images of the real world have been produced for many years by special stereoscopic film cameras, the advent of computer graphics animation technology has provided another forum for generating simulated 3D images. The rendering of the stereoscopic images by computer graphics animation involves a similar process as used in generating 2D media presentations. As for computer graphics animation generated for 2D media presentations, a 3D modelling construct is generated and manipulate over time. However, when generating stereoscopic images, two virtual cameras (a left and a right camera) are created which have slightly offset perspectives. The rendering for each camera is performed in the same manner as for standard 2D media presentations. In most instances, it is preferable if the left and right cameras are fixed to each other in terms of position and camera alignment, in order to simulate a person's eyes travelling through the computer space.

As with real world stereoscopic images, two main techniques are available for generating stereoscopic computer graphics images. The first technique involves aligning the camera axes (or fields of view) of the left and right cameras so that they are parallel. This method is capable of producing orthostereoscopic images, in which the relative distances between the cameras and the various constructs in computer space and the relative sizes of these constructs, essentially match the apparent sizes and distances when presented to the viewer. In order to generate orthostereoscopic images, it is necessary for the separation between the left and right cameras to be scaled to match the interocular distance between an average person's eyes as if such average person were modelled in the computer space. Because the camera axes are parallel, the fields of view do not overlap completely. As a result, unless some further step is taken, strips of non-overlapping (and hence non-stereo) image information exist at the left and right edges of the combined left and right images.

The second technique attempts to address this perceived problem in that it involves converging the camera axes of the left and right cameras. This process creates a plane at which the left and right camera fields of view overlap completely. A consequence of converging the camera axes, however, is that the stereoscopic images produced, are not orthostereoscopic.

The term "stereoscopic camera" is commonly understood by those skilled in the art to mean the combination of a left and a right camera linked together for the purpose of generating stereoscopic images. Even though it should be understood that a single camera is by necessity monoscopic in nature in order to distinguish between a camera used to create the original computer graphics animation intended for 2D presentation (a "2D camera"), the term "stereoscopic camera", as used in the specification including the claims refers to a camera (such as the left or right camera) which is being used for purpose of generating a stereoscopic animation sequence.

It has been known to reuse the modelling data and the related animation curve data generated for a 2D media presentation, in order to render stereoscopic images. However, these techniques do not readily lend themselves to reusing the camera animation curves generated in the process of creating the 2D media presentation—unless straight line motion without camera rotation was used to manipulate the original 2D camera, as discussed in relation to FIG. 2F below, applying a simple transposition of the original 2D camera animation curve in order to generate one new camera animation path for a second new camera, or alternatively to generate two new camera animation paths for two new cameras, results in serious stereoscopic errors. Consequently, the known techniques have required considerable time and expense on the part of the computer graphics animators to determine the camera animation curves for the left and right cameras, for the intended 3D presentation. Typically this process involves reviewing the original 2D presentation, and then estimating the camera animation curves necessary for the left and right cameras, in order for the rendering process to generate stereoscopic sequences which roughly parallel the original 2D sequences.

Accordingly, there is a need for a method and apparatus which permits efficient reuse of data created during the process of creating computer graphics animation for a 2D presentation, in order to create a 3D stereoscopic presentation.

In the field of generating stereoscopic computer animation sequences, it is known to use a spreadsheet to make certain technical calculations in advance of performing costly rendering, to determine if there are potential difficulties with respect to the positioning of the cameras in the modelling scene, or with respect to the interocular distance between the stereoscopic cameras. Such potential difficulties include having an object appearing to be very close to the viewer in real world space—in these cases, the stereoscopic image is created may cause discomfort to the viewer's eyes.

In the prior art spreadsheets, it was necessary to ensure that the modelling units used in generating the modelling constructs in computer space were scaled to real world units of measurement, such as in feet or meters. This enabled the computer graphics animator to determine what the apparent location and size in the real world of different objects in the scene would be when the 3D animation sequence was displayed. If the modelling constructs were not scaled in real world units of measurement, prior art spreadsheets required the modelling units to first be converted into real world units, before the spreadsheet calculations could be performed.

Accordingly, there is also a need for a method of determining certain characteristics of an animation sequence, such as the apparent (to the viewer) size and distance of objects or modelling constructs appearing in the sequence, prior to the sequence being rendered, while permitting the modelling units to be arbitrary (but consistent) units of measurement.

SUMMARY OF THE INVENTION

The present invention is directed towards a system for generating stereoscopic image data from animation data comprising modelling data and 2D camera animation curve data generated and stored during the process of creating a computer graphics animation sequence(s) for a monoscopic or 2D presentation.

In one aspect, the invention comprises a system for generating stereoscopic camera animation curve data from 2D camera animation curve data. The system comprises a database which stores modelling data and the 2D camera animation curve data, and a stereoscopic camera animation curve data generator. The stereoscopic camera animation curve data generator inputs the 2D animation curve data, and generates stereoscopic camera animation curve data for stereoscopic cameras. The stereoscopic camera animation curve data generator comprises a node generator which generates a dummy node, a first stereoscopic camera fixed in position in position and alignment relative to the dummy node, as well as a second stereoscopic camera fixed in position and alignment relative to the dummy node and separated from the first stereoscopic camera.

In another aspect, the invention comprises a system for generating stereoscopic camera animation curve data from 2D camera animation curve data created for a 2D camera. The system comprises a database for storing modelling data and the 2D camera animation curve data, and a stereoscopic camera animation curve data generator. The stereoscopic camera animation curve data generator inputs the 2D animation curve data, generates a second stereoscopic camera fixed in position and alignment relative to the 2D camera and separated from the 2D camera, and generates second stereoscopic camera animation curved data.

In yet another aspect, the invention comprises a system for generating stereoscopic image data from animation data comprising modelling data and 2D camera animation curve data. This system comprises a database in which the modelling data and the 2D camera animation curve data are stored, as well as a stereoscopic camera animation curve data generator and an animation sequence renderer. The stereoscopic camera animation curve data generator inputs the animation curve data and generates stereoscopic camera animation curve data for at least one stereoscopic camera. The renderer inputs the stereoscopic camera animation curve data and the modelling data and generates stereoscopic image data.

The present invention is also directed toward a method for generating stereoscopic camera animation curve data from 2D camera animation curve data, comprising the following steps:

(a) generating a dummy node;

(b) generating a first stereoscopic camera fixed in position and alignment relative to the dummy code;

(c) generating a second stereoscopic camera fixed in position and alignment relative to the dummy node and separated from the first stereoscopic camera;

(d) applying the 2D animation curve data to the dummy node;

(e) generating first stereoscopic camera animation curve data correlated to the 2D animation curve data; and (f) generating second stereoscopic camera animation curve data correlated to the 2D animation curve data.

In another aspect, the present invention is also directed toward a method for generating stereoscopic camera animation curve data from 2D camera animation curve data created for a 2D camera, comprising the following steps:

(a) generating a second stereoscopic camera fixed in position and alignment relative to the 2D camera and separated from the 2D camera;

(b) applying the 2D animation curve data to the 2D camera; and (c) generating second stereoscopic camera animation curve data correlated to the 2D animation curve data.

In yet another aspect, the present invention is also directed toward a method for generating stereoscopic image data from animation data comprising modelling data and 2D camera animation curve data, comprising the following steps:

(a) generating a dummy node;

(b) generating a first stereoscopic camera fixed in position and alignment relative to the dummy node;

(c) generating a second stereoscopic camera fixed in position and alignment relative to the dummy node and separated from the first stereoscopic camera;

(d) applying the 2D animation curve data to the dummy node;

(e) generating first stereoscopic camera animation curve data correlated to the 2D animation curve data;

(f) generating second stereoscopic camera animation curve data correlated to the 2D animation curve data;

(g) rendering the stereoscopic image data correlated to the first stereoscopic camera animation curve data and to the modelling data; and (h) rendering second stereoscopic image data correlated to the second stereoscopic camera animation curve data and to the modelling data.

In still another aspect, the subject invention is directed towards a system for determining attributes of a stereoscopic image to be generated using modelling data and a first stereoscopic camera and a second stereoscopic camera. The system comprises an input device and a processor capable of receiving measured data from the input device correlated to measurements in arbitrary but internally consistent modelling units taken from the modelling data and the position of the first and second stereoscopic cameras, for calculating attribute data correlated to attributes of the stereoscopic image in real world units, and an output device operationally coupled to the processing means for displaying the attribute data.

BRIEF DESCRIPTION OF THE DRAWINGS

The present invention will now be described, by way of example only, with reference to the following drawings, in which like reference numerals refer to like parts and in which:

FIG. 6 is a schematic diagram of a spreadsheet used to implement the third embodiment of the subject invention of FIG. 5.

DETAILED DESCRIPTION OF THE PREFERRED EMBODIMENT

Figure 1A:
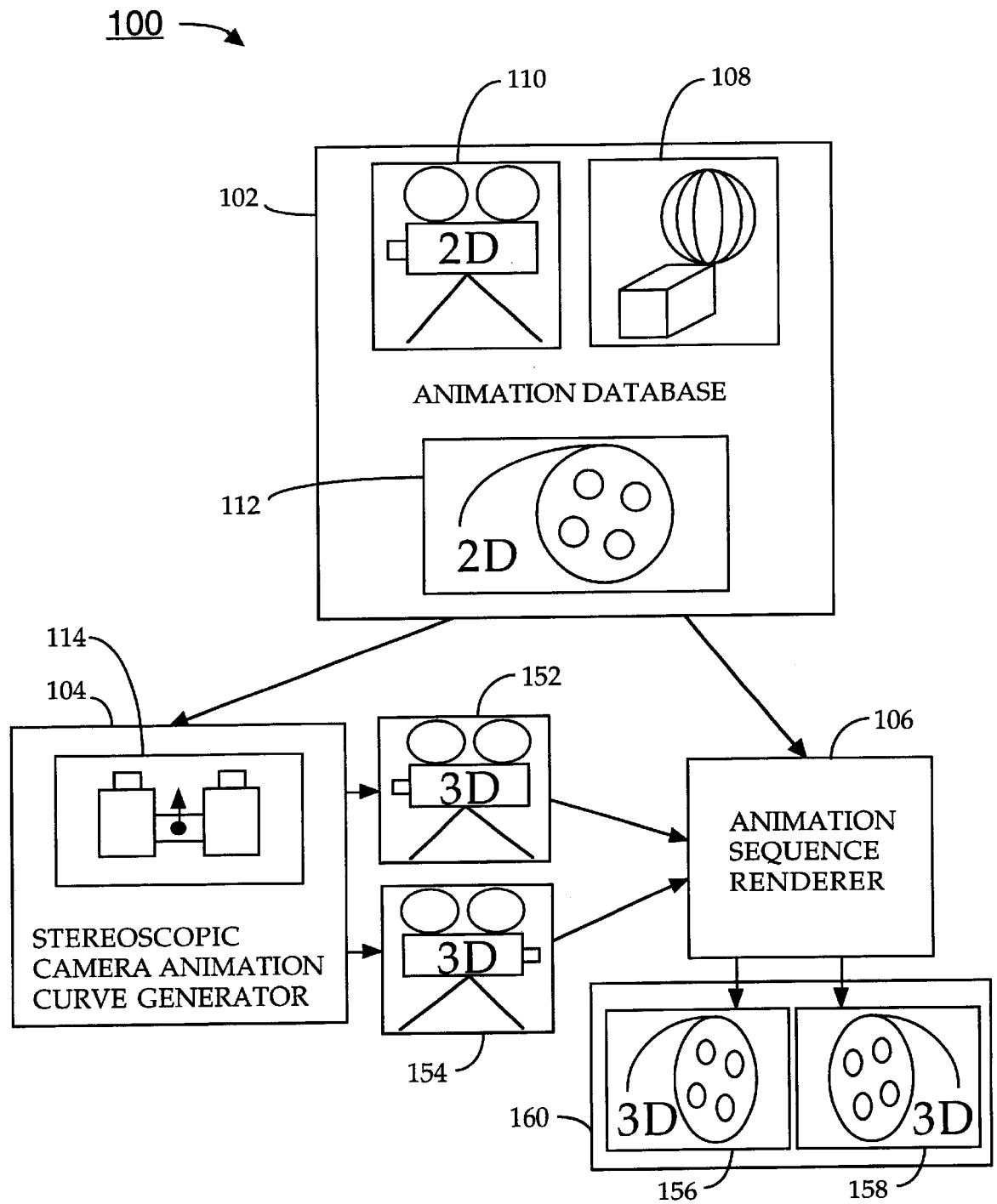
FIG. 1A is a schematic diagram of the components of a first embodiment of the subject invention.

Referred to FIG. 1A, illustrated therein is first embodiment of a system for generating stereoscopic image data shown generally as 100 made in accordance with the subject invention. The system 100 comprises a 2D animation database 102, a stereoscopic camera animation curve generator 104, and an animation sequence renderer 106. The animation database 102 and the animation sequence renderer 106 are both well-known by those skilled in the art.

The 2D animation database 102 stores data previously generated during a process of creating computer graphics animation sequences intended for display on 2D media, such as film or video (without attempting to create stereoscopic images). The 2D database 102 contains the modelling data 108 from the animation sequences, which includes data correlated to the 3D modelling constructs, as well as the modelling animation curve data correlated to the animation curves used to move and manipulate the various modelling constructs. The 2D database 102 also contains 2D camera animation curve data 110 correlated to the animation curves applied to the 2D camera in order to view or capture each frame it the animation sequence. It should be understood that references herein to a 2D camera in this specification including the claims refer to a virtual camera used in the creation of a computer graphics animation sequence intended for presentation on 2D media (without attempting to create stereoscopic images). Preferably, the 2D database 102 will also contain 2D rendered data 112 correlated to the animation sequences as rendered during the previous 2D animation process.

It should be understood that the 2D database 102 may be unitary, or may comprise several database mechanisms which store some or all of the 2D data 108, 110 and 112.

Additionally, it should be understood that the 2D database 102 may comprise any form of data storage mechanism which utilizes electronic, magnetic or optical storage or similar data storage techniques. It should also be understood that the 2D database 102 may be physically proximate to the other components of the system 100, or may be physically remote from the other components.

The stereoscopic camera animation curve generator 104 is electronically coupled to the recipient 2D database 102 so as to be capable of retrieving the 2D data 108, 110 and 112. The generator 104 comprises a node generator 114 for generating a dummy node and calculating stereoscopic camera animation curve data for at least one stereoscopic camera.

Figure 2A:
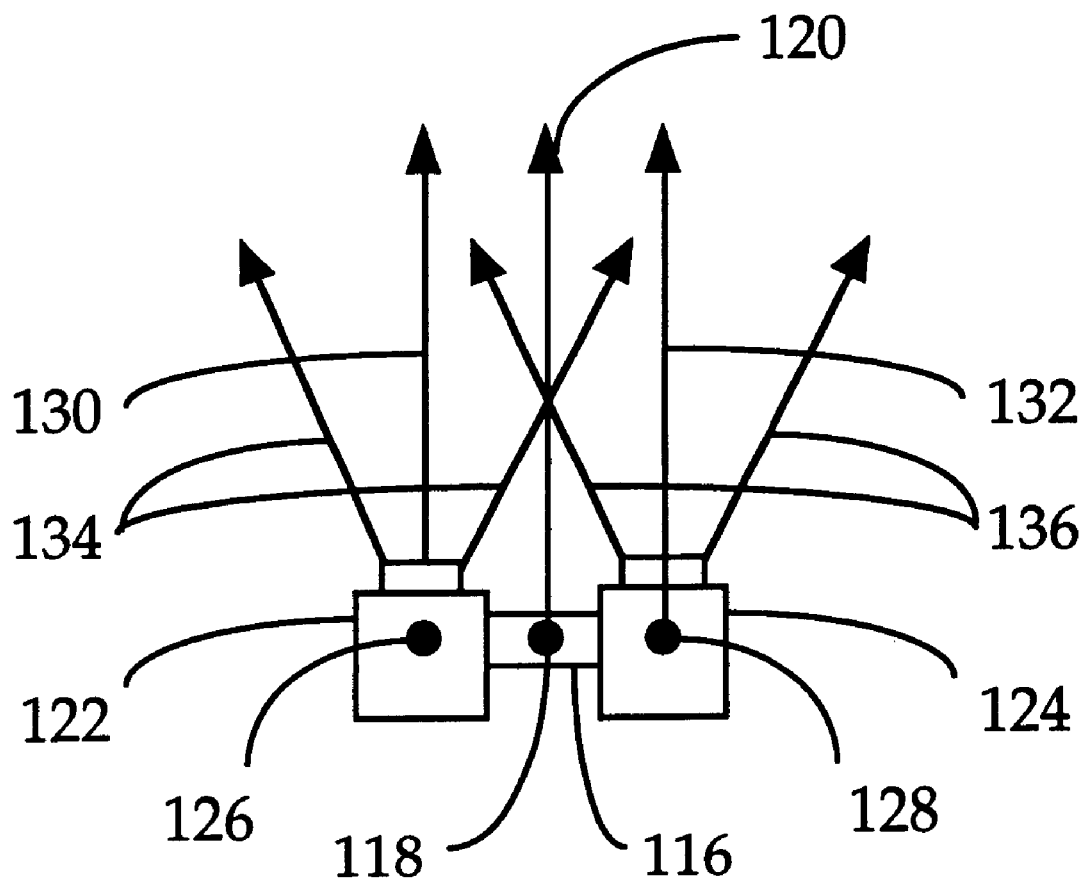
FIG. 2A is an overhead view of a representation of a node fixedly coupled to a pair of stereoscopic cameras having their camera axes in parallel alignment, generated in accordance with the subject invention.

The node generator 114 typically comprises a suitably programmed computer system capable of generating a dummy node 116 (as illustrated in FIG. 2A). As will be understood by one skilled in the art, the dummy node 116 is a mathematical construct which may be positioned and oriented in the computer space represented by the modelling data 108, as illustrated by node point 118 and node direction vector 120. The node generator 114 also creates a left stereoscopic camera 122 and a right stereoscopic camera 124 which are fixed in relative position and alignment to the dummy node 116, and are spaced from each other.

At this stage, the characteristics of the left camera 122 and the right camera 124, such as field of view, aspect ratio, resolution and horizon position, typically have not yet been defined and as with the dummy node 116, may be treated as points in space represented by left camera point 126 and right camera point 128, each having a particular orientation illustrated by left camera direction vector 130 and right camera direction vector 132, respectively. The cameras 122, 124 may be defined as transformation functions of the dummy node 116. For illustration purposes, cameras 122, 124 have been illustrated in FIG. 2A as each having a particular field of view represented by left camera field of view vectors 134 and right camera field of view vectors 136. However, as discussed above, typically the characteristics of the cameras 122, 124 have not been defined at this stage (although in most instances, they will need to be identical in order to render optimal stereoscopic images).

Figure 2B:
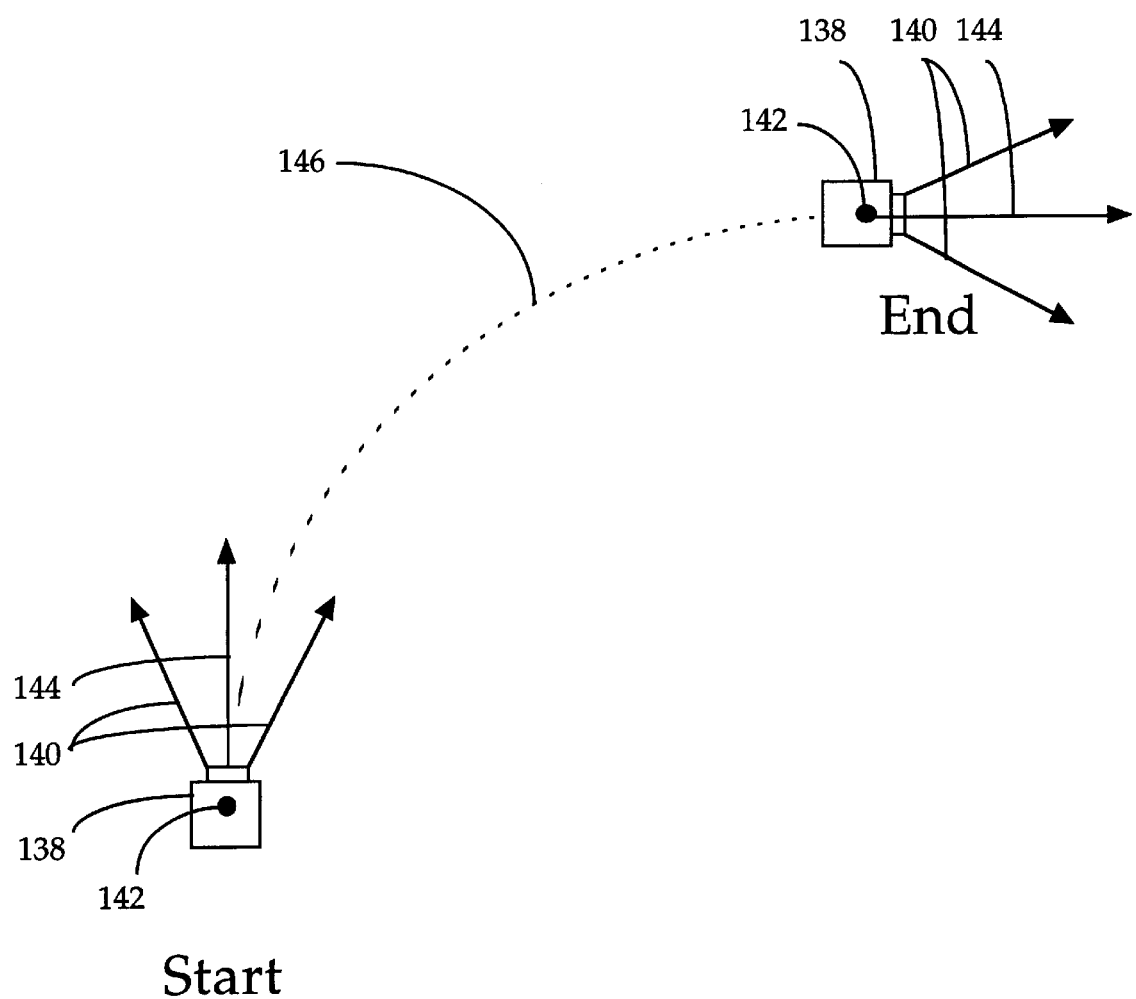
FIG. 2B is an overhead view of a representation of the 2D camera previously used to generate the original 2D animation sequence, following the 2D camera animation curve path.

Referring now to FIG. 2B, illustrated therein is a 2D camera 138, having a field of view illustrated by 2D camera field of view vectors 140, which was used to generate the 2D rendered data 112 correlated to the original animation sequences for 2D presentation. As with the left stereoscopic camera 122 and the right stereoscopic camera 124, 2D camera 138 may be considered to be a point in space represented as 2D camera point 142 having a particular orientation illustrated by 2D camera direction vector 144. Dotted line 146 represents the animation curve applied to the 2D camera (and stored as 2D camera animation curve data 110) in order to generate the original animation sequences. For the purpose of illustrating the effect on the 2D camera 138 as it followed the animation curve 146 during the original rendering process, 2D camera 138 has been illustrated at two points in time, at the start of the animation curve 146 denoted by 'Start', and at the end of the animation curve 146 denoted by 'End'.

Preferably, the left stereoscopic camera 122, the dummy node 116 and the right stereoscopic camera 124 are positioned and fixed linearly, with the dummy node 116 centred between the left stereoscopic camera 122 and the right stereoscopic camera, as illustrated in FIG. 2A. As will be understood by one skilled in the art, as noted above, the scaled "camera interocular" distance between the left camera 122 and the right camera 124 will typically be determined by the computer animator, and in most instances will preferably be scaled to match the interocular distance between an average person's eyes as if such average person were modelled in the computer space, in order to generate orthostereoscopic animation sequences.

Figure 2C:
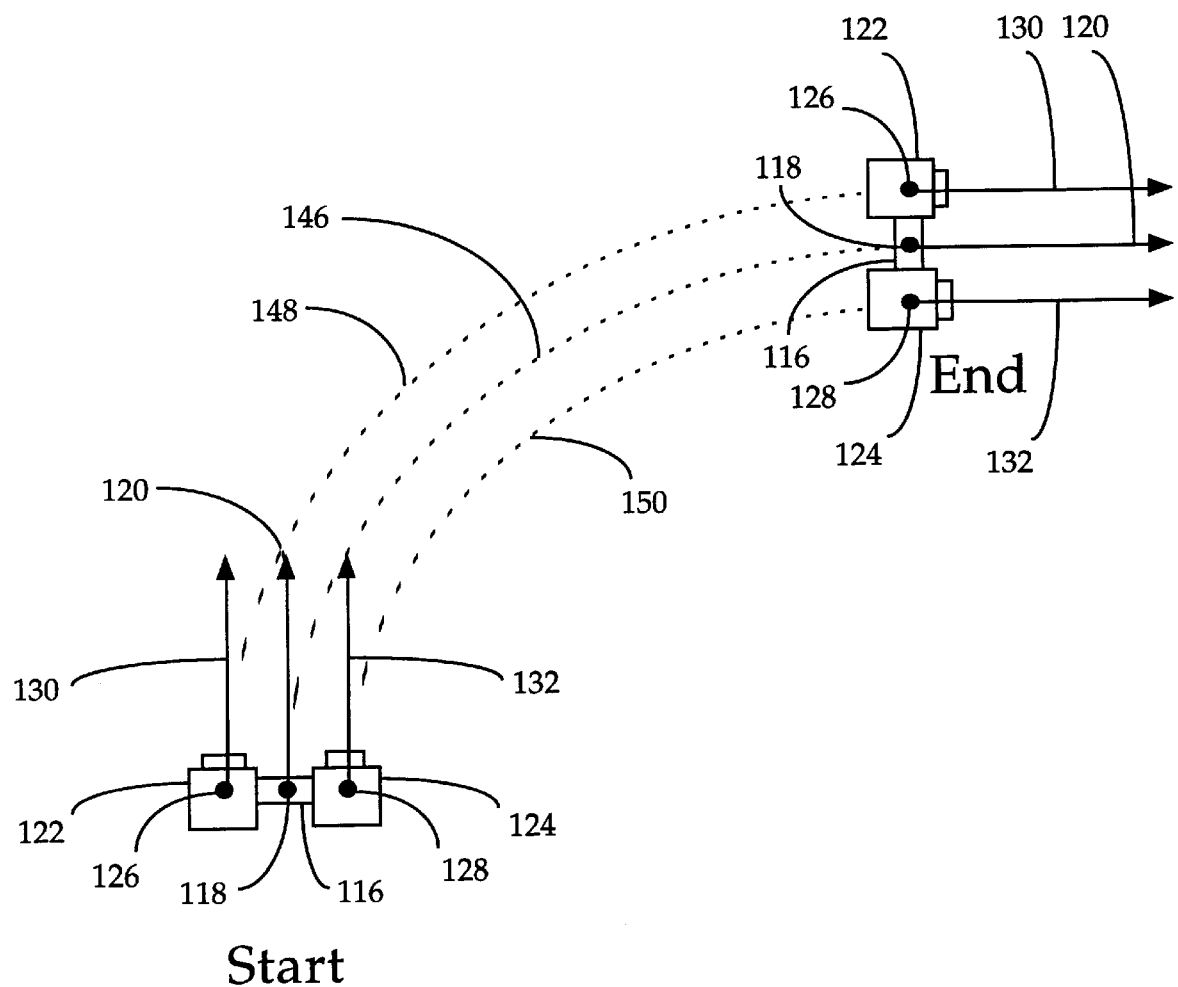
FIG. 2C is an overhead view of a representation of the node and stereoscopic cameras of FIG. 2A, in which the 2D camera animation curve path of FIG. 2B is applied to the node, in accordance with the first embodiment of the subject invention.

The node generator 104 is programmed to input the 2D camera animation curve data 110, and apply that data 110 to the dummy node 116. Referring now to FIG. 2C, as the dummy node 116 tracks along the 2D camera animation curve 146 stored in the data 110, the corresponding positions and orientations of the left stereoscopic camera 122 and the right stereoscopic camera 124 are calculated, thereby defining the left camera animation curve represented by dotted line 148 for the left camera 122 and the right camera animation curve represented by dotted line 150 for the right camera 124. The data correlated to the animation curves 148, 150 is stored respectively as left stereoscopic camera animation curve data 152 and right stereoscopic camera animation curve data 154.

As will be understood by one skilled in the art, graphics animation software typically utilizes a hierarchical structure to manipulate and move the modelling constructs within virtual space. Accordingly, most modelling constructs are positioned on a hierarchical tree of parents and children. Movements and manipulations affecting a parent flow down the tree and similarly affect the children. However, movements and manipulations directed to a child on the tree will not flow up the tree to affect the child's parent.

As should therefore be understood, while the camera animation curve generator 104 (and node generator 114) may comprise software created specifically for the purpose of generating camera animation curves in the manner described above, alternatively the types of computer animation software which utilize a hierarchical structure offer the capability for the dummy node 116 to be created as a parent on a hierarchical tree, linked in fixed position relative to the cameras 122, 124 which are created as children to the dummy node 116. As a result, when the original 2D camera animation curve is applied to the dummy node 116 as a parent on the tree, the child cameras 122, 124 maintain their position relative to the dummy node 116, from which the respective camera animation curve data 152, 154 can be determined.

Figure 2D:
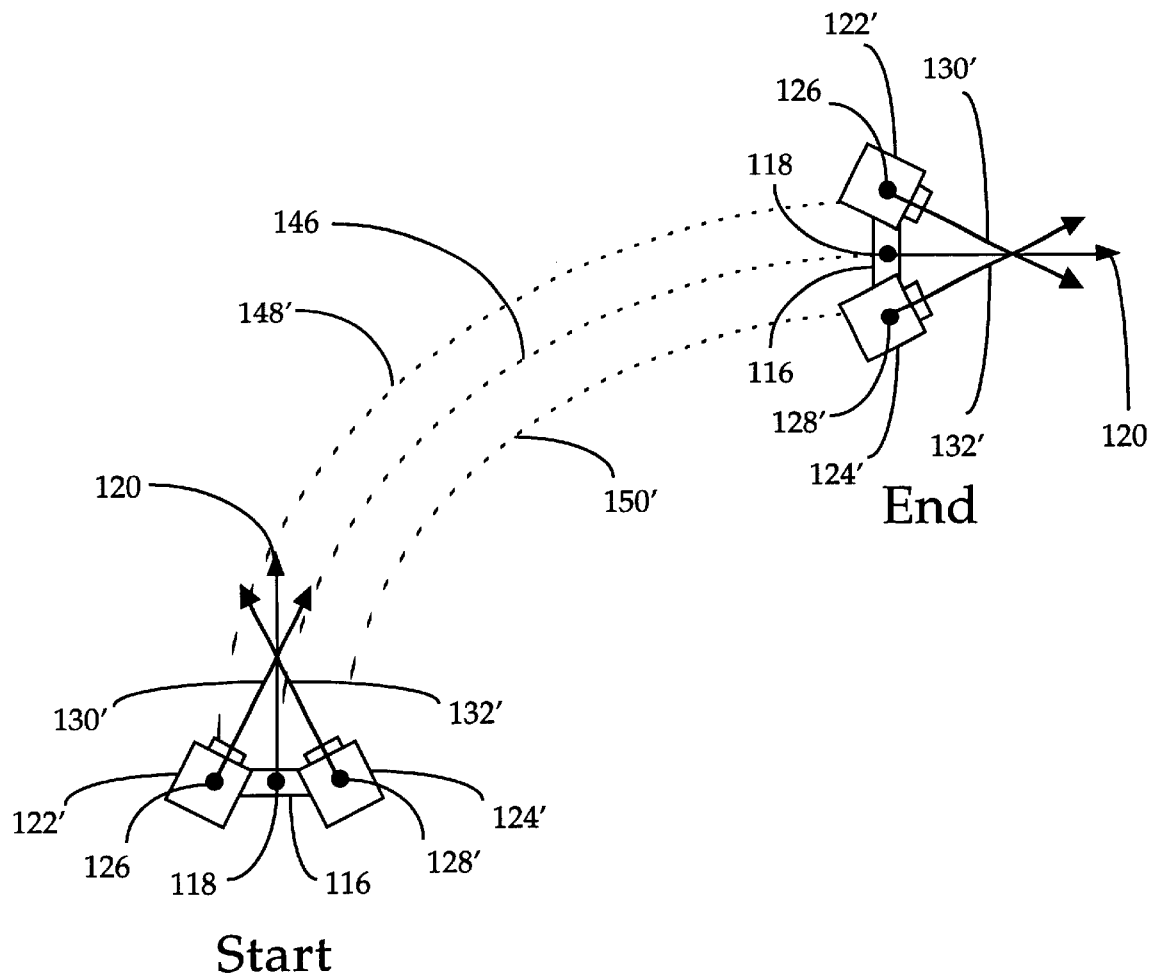
FIG. 2D is an overhead view of a representation of a node fixedly coupled to a pair of stereoscopic cameras having their camera axes converged, in which the 2D camera animation curve path of FIG. 2B is applied to the node, in accordance with the first embodiment of the subject invention.
Figure 2E:
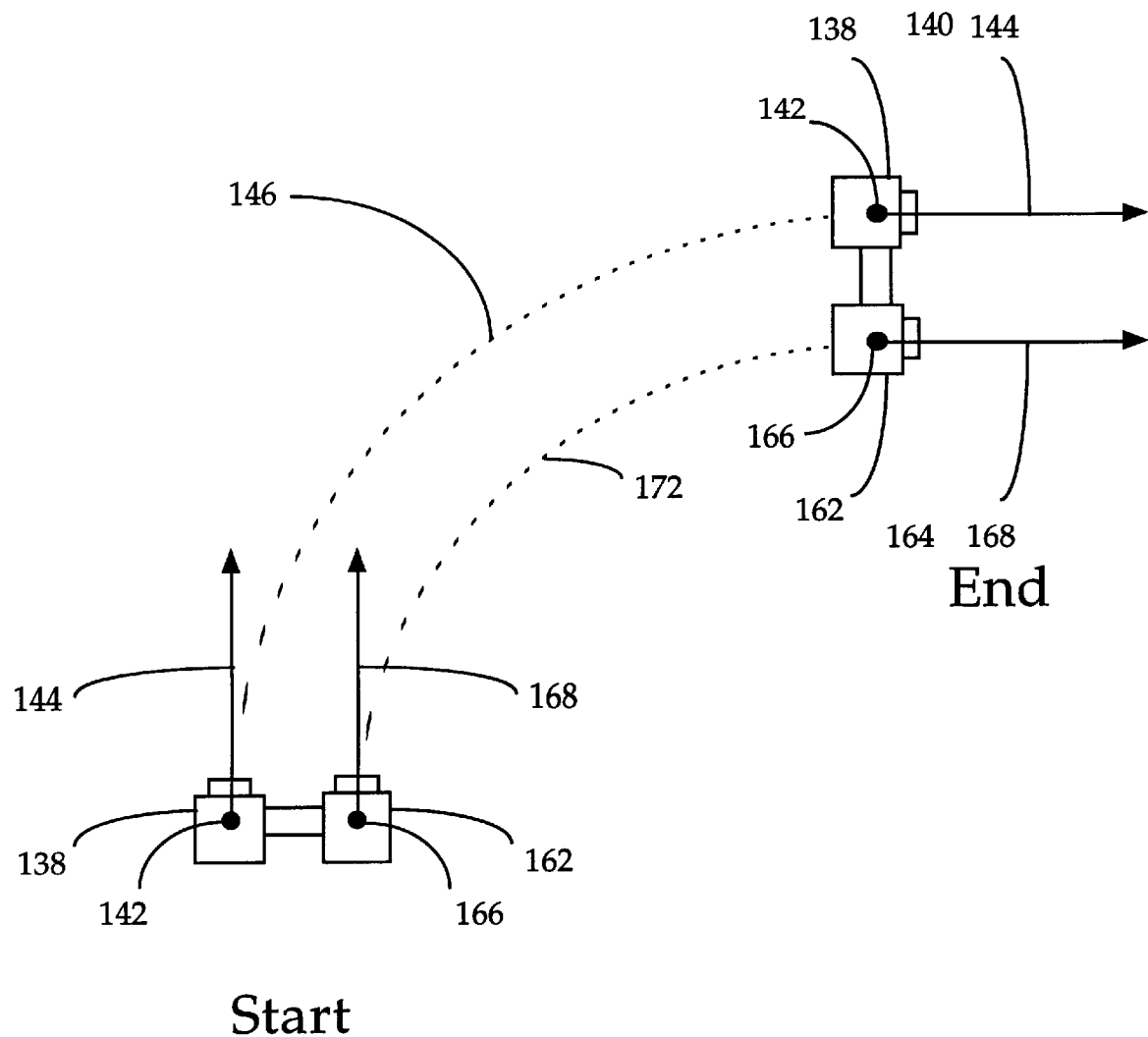
FIG. 2E is an overhead view of the 2D camera and 2D camera animation curve path of FIG. 2B in which the 2D camera is fixedly coupled to a second stereoscopic camera as the 2D camera follows its 2D camera animation curve path, in accordance with the alternative embodiment of the subject invention.

While FIG. 2C illustrates use of the first embodiment of the subject invention in which the camera axes (represented by camera direction vectors 130, 132) of the left and right cameras 122, 124 are in parallel alignment, FIG. 2D illustrates use of the first embodiment in which the camera axes (represented by camera direction vectors 130', 132') of the left and right cameras 122', 124' are converged. It should be understood that the angle of convergence of the orientation of the cameras 122', 124' has been somewhat exaggerated for illustrative purposes.

The animation sequence renderer 106 will typically comprise a computer system running standard, commercially available computer graphics animation software. Typically such animation software permits the characteristics of the camera(s) (such as field of view, aspect ratio, resolution and horizon position) to be used in the rendering process to be determined by the computer graphics animator. The renderer 106 is capable of retrieving the modelling data 108 stored on the animation database 102, as well as the left stereoscopic camera animation curve data 152 and right stereoscopic camera animation curve data 154.

Some commercial computer graphics animation software applications (such as WAVEFRONT™, by Alias|Wavefront, a division of Silicon Graphics Limited) are capable of rendering images as seen from the left and right stereoscopic cameras as a single defined operation, provided that two camera animation curve paths are specified. With such animation software, the animation sequence renderer 106 will be capable of inputting both the left animation curve data 152 and the right animation curve data 154 (in addition to the modelling data 108) in order to sequentially render the left stereoscopic animation sequence data 156 and the right stereoscopic animation sequence data 158 corresponding to a single frame in the animation sequence, for each frame in the animation sequence.

However, some other animation software (such as SOFTIMAGE® by Softimage Inc.) is only capable of rendering animation sequences for a single camera at a time. If such software is used in the renderer 106, the left animation sequence data 156 and the right animation sequence data 158 must be separately rendered by separately inputting the respective animation curve data 152, 154. Together, the left sequence data 156 and the right sequence data 158 form the 3D animation sequence data 160 to be used for stereoscopic display.

Alternatively, it should be understood that instead of generating the complete animation curve data 152, 154 for an animation sequence, the node generator 104 may simply generate and output to the animation sequence renderer 106 the animation curve data 152, 154 corresponding to a single frame in the 3D animation sequence, at a time. In this manner, the 3D animation sequence data 156, 158 will be generated in parallel with the generation of the animation curve data 152, 154. In the event that the rendered 106 is only capable of generating the entire animation sequence date 156 or 158 corresponding to a single camera 122 or 124 at a time, it should be readily understood that the node generator 104 may input the 2D camera animation curve data 110, and apply that data 110 to the dummy node 116 to generate and output to the renderer 106 the animation curve data 152 and 154 for one of the cameras 122 or 124 corresponding to a single frame in the 3D animation sequence, at a time. In a similar fashion, the node generator 104 would then reinput the 2D camera animation curve data 110 to generate and output to the renderer 106 the remaining animation curve data 152 or 154 for the other of the two cameras 122 or 124, corresponding to a single frame in the animation sequence, at a time.

Prior to display, the 3D animation sequence data 160 will typically be converted and printed onto celluloid for cinematographic projection, or into videotape format. As will be understood by one skilled in the art, for cinematographic projection, the left sequence data 156 will be converted and printed onto a separate film (for projection by a separate projector) from that of the light sequence data 158. For videotape presentation on a TV screen or similar device, the left sequence data 156 and the right sequence data 158 will typically be combined in a manner known in the art for display by a single videotape player device connected to a display device (such as a TV).

Figure 3:
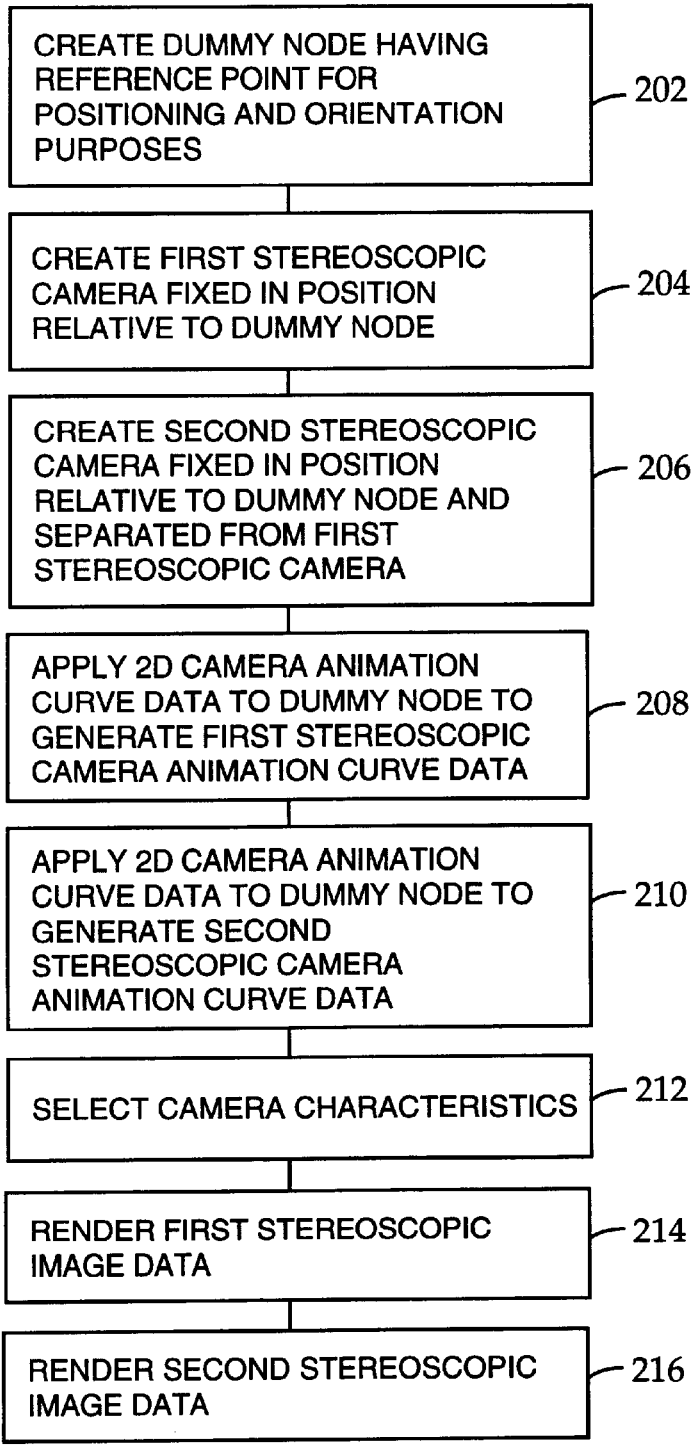
FIG. 3 is a flow chart showing the method used by the apparatus of the first embodiment to generate stereoscopic image data.

FIG. 3 illustrates the steps of the method 200 carried out by the system 100 made in accordance with the first embodiment of the subject invention. Once the animation data comprising modelling data 108 and 2D camera animation curve data 110 generated during a previous process of creating computer graphics animation sequences intended for monoscopic display, has been selected and stored such as in an animation database 102, a dummy node 116 which exists essentially as a piece of geometry and having a reference point for positioning purposes as well as for orientation purposes, is created (Block 202). A first stereoscopic camera is then generated which is fixed in position and alignment relative to the dummy node 116 (Block 204). Similarly, a second stereoscopic camera is then generated which is fixed in position and alignment relative to the dummy node, and separated from the first stereoscopic camera (Block 206). Preferably, the first stereoscopic camera, the dummy node 116 and the second stereoscopic camera are positioned and fixed linearly, with the dummy node 116 centered between the first and second stereoscopic cameras, as generally illustrated by left stereoscopic camera 122, dummy node 116 and right stereoscopic camera 124, in FIG. 2A.

The 2D camera animation curve data is then applied to the dummy node, and first stereoscopic camera animation curve data is generated which correlates to the path followed by the first stereoscopic camera as the dummy node tracks the 2D camera animation curve data (Block 208). Through a similar process, second stereoscopic camera animation curve data is generated (Block 210). Although the steps shown in Block 208 and 210 are listed separately, it should be understood that the first and second camera animation curve data may be generated essentially simultaneously.

Preferably the camera characteristics, such as field of view, aspect ratio, resolution and horizon position, of the first and second stereoscopic cameras may be selected manually (Block 212). Then, in known fashion and typically using standard computer graphics animation software, the modelling data and the first stereoscopic animation (curve data are used to render first stereoscopic image data correlated to the intended stereoscopic animation sequence (Block 214). Similarly, the modelling data and the second stereoscopic animation curve data are used to render second stereoscopic image data correlated to the intended stereoscopic animation sequence (Block 216). Although the steps shown in Blocks 214 and 216 are listed separately, it should be understood that the first and second stereoscopic image data may be generated essentially simultaneously, in one operation.

In some instances, it may be most cost effective to reuse the original 2D computer graphics animation sequence as the first stereoscopic animation sequence, and to generate a second stereoscopic animation sequence which is rendered using a camera offset to the right or to the left from the original 2D camera. As a result, in an alternative embodiment of the system, shown generally as 100' in FIG. 1B, the stereoscopic camera animation curve generator 104' only needs to be capable of generating the camera animation curve data for a second stereoscopic camera.

Figure 1B:
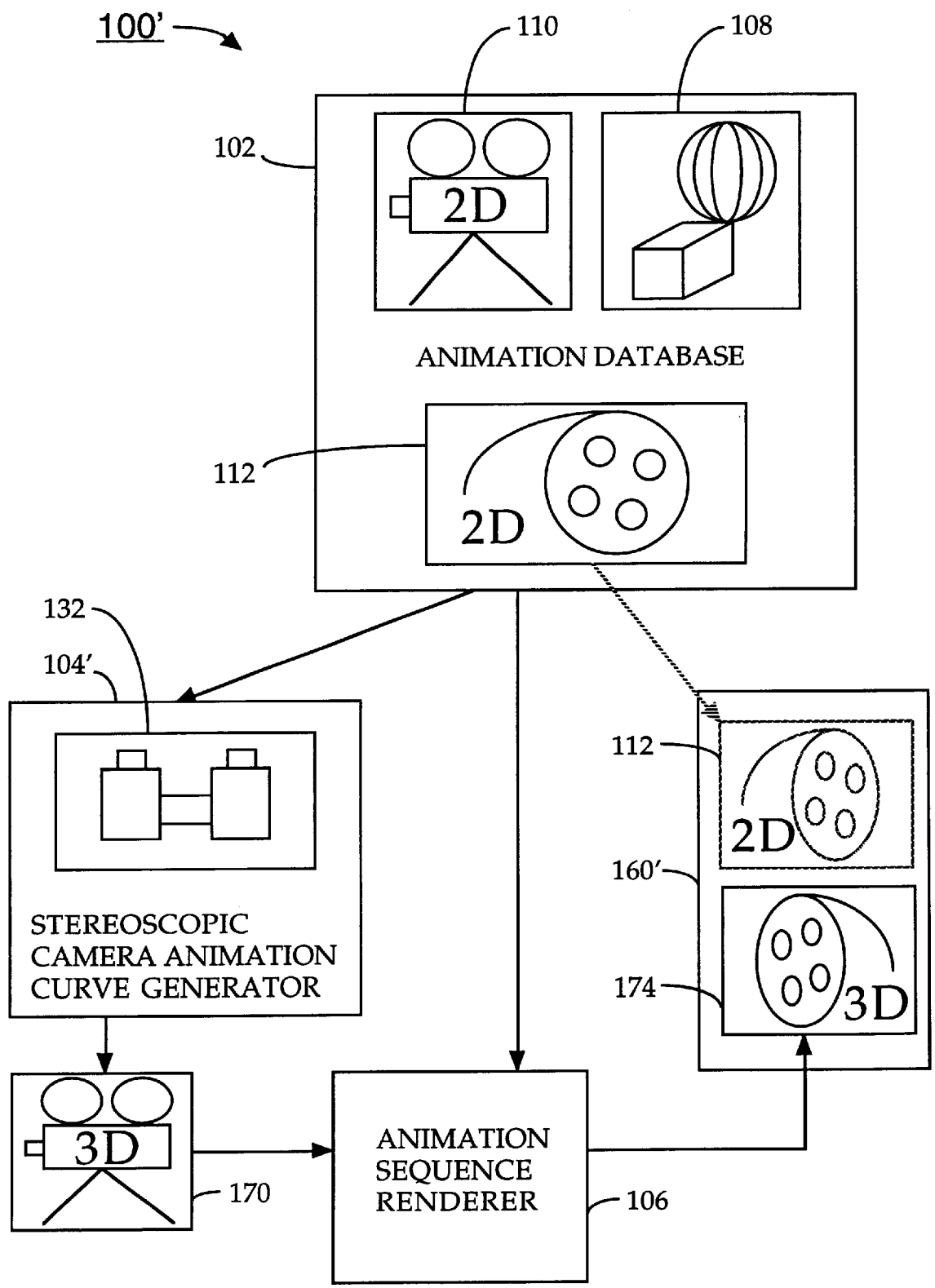
FIG. 1B is a schematic diagram of the components of an alternative embodiment of the subject invention.
Figure 2F:
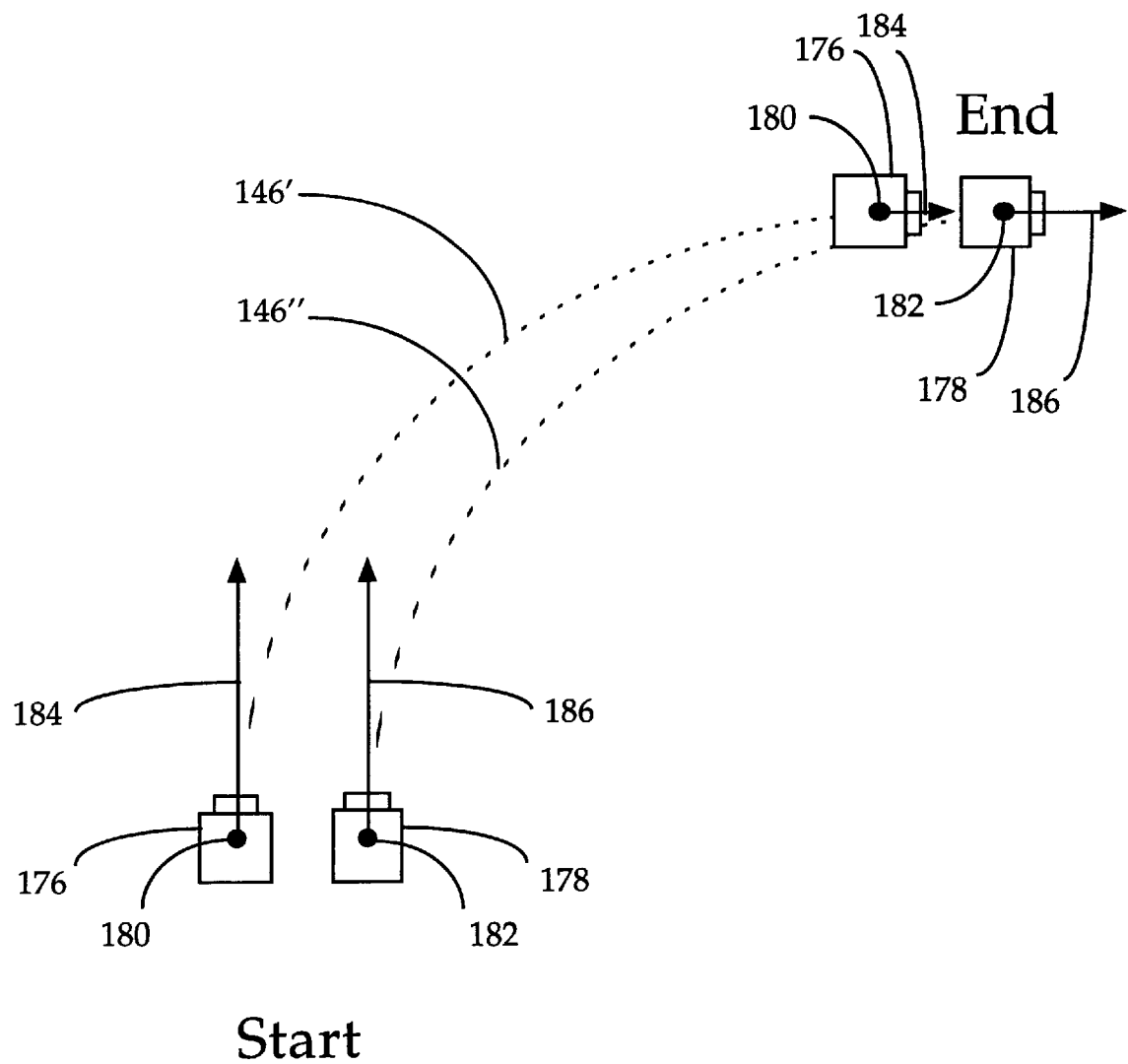
FIG. 2F is an overhead view of the 2D camera and 2D camera animation curve path of FIG. 2B in which a simple linear transformation is applied to the 2D camera animation curve path, to generate a camera animation curve path for a second stereoscopic camera, to illustrate the stereoscopic errors which can occur if the method and apparatus of the subject invention is not used.

Referring simultaneously to FIGS. 1B and 2F, in such instances, the node generator 114 illustrated in FIG. 1A may be replaced by a second stereoscopic camera animation curve generator 132. Camera animation curve generator 132 creates a second stereoscopic camera 162 fixed in relative position and alignment to and spaced from the original 2D camera 138. In a similar manner as noted previously in connection with left and right cameras 122, 124, the second camera 162 may be considered to be a point in space represented as second stereoscopic camera point 166 having a particular orientation illustrated by second stereoscopic camera direction vector 168, as illustrated in FIG. 2F. Utilizing a transformation function which maintains the fixed positional and camera axes alignment relationship between the original 2D camera and the second stereoscopic camera, the camera animation curve generator 132 creates second stereoscopic camera animation curve data 170 correlated to second stereoscopic camera animation curve represented by dotted line 172.

In a similar manner as described in connection with the first embodiment, the animation sequence renderer 106 inputs the second stereoscopic animation curve data 170 (in addition to the modelling data 108) and renders the second stereoscopic animation sequence data 174. The computer graphics animator typically inputs the camera characteristics of the second camera 162 into the renderer 106 at the rendering stage (at which point they should preferably match the camera characteristics of the 2D camera 138). Together, the 2D rendered data 112 (as shown in dotted outline) and the second stereoscopic sequence data 174 form the 3D animation sequence data 160' to be used for stereoscopic display.

Figure 4:
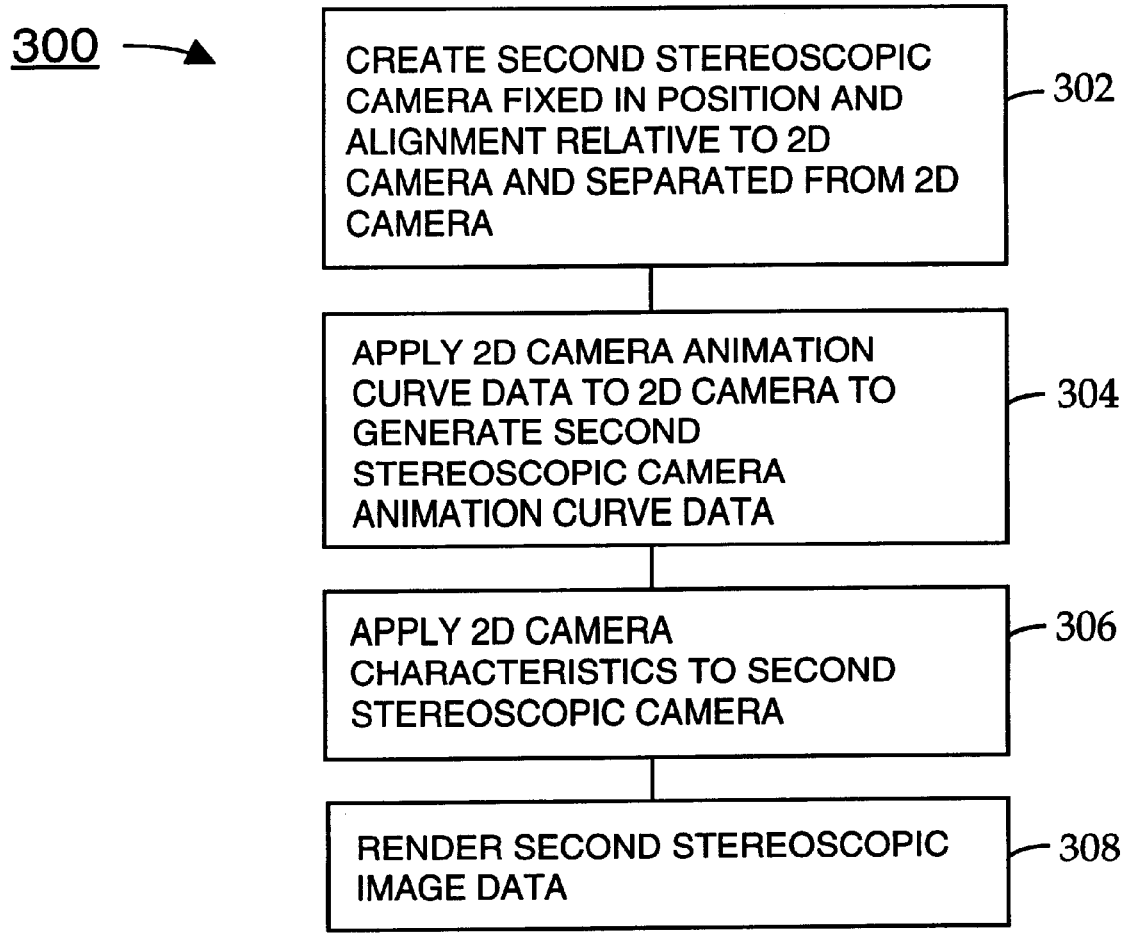
FIG. 4 is a flow chart showing the method used by the apparatus of the alternate embodiment to generate stereoscopic image data.

FIG. 4 illustrates the steps of the method 300 carried out by the system 100' made in accordance with the alternative embodiment of the subject invention. Once the animation data comprising modelling data 108 and 2D camera animation curve data 110 generated during a previous process of creating computer graphics animation sequences intended for monoscopic display has been selected and stored such as in an animation database 102, a second stereoscopic camera is then generated which is fixed in position and alignment relative to the 2D camera, and separated from the 2D camera (Block 302). The 2D camera animation curve data is then applied to the 2D camera, and second stereoscopic camera animation curve data is generated which correlates to the path followed by the second stereoscopic camera as the 2D camera tracks the 2D camera animation curve data (Block 304).

In most instances, the camera characteristics of the second stereoscopic camera will simply be required to match the camera characteristics of the 2D camera (Block 306). Then, in known fashion and typically using standard computer graphics animation software, the modelling data and the first stereoscopic animation curve data are used to render second stereoscopic sequence data correlated to the intended stereoscopic animation sequence (Block 308).

As should be understood by one skilled in the art, reusing the original 2D computer graphics animation sequence as the first stereoscopic animation sequence in accordance with the alternative embodiment of the subject invention, typically produces stereoscopic animation sequences which are slightly less optimal than stereoscopic animation sequences in which two new stereoscopic cameras are created in order to render both the left and right stereoscopic animation sequence, in accordance with the first embodiment of the subject invention.

The reason for typically preferring the latter approach is that with a person's eyes, the centred direction of view (or apparent point of view) originates in between the eyes—each eye is slightly offset from the centred direction of view. When the left and right eye images are fused by the person's brain to generate stereoscopic images, the direction of view that the brain perceives originates from the midpoint between the eyes.

With the 2D camera, the direction of view typically originates from the midpoint of the 2D camera, with the optimal direction of view (as determined by the computer graphics animator) centred on the action in the sequence. As a result, when the 2D camera animation curve is applied to the dummy node of the first embodiment, this optimal direction of view is centred between the two stereoscopic cameras.

However, when the original 2D animation sequence is reused as in the alternative embodiment, the optimal direction of view continues to originate from the centre of the 2D camera, and not from the mid-point between the 2D camera and the second stereoscopic camera. This creates a slightly offset (from the viewer's perspective) point of view when the two sequences are merged to form a stereoscopic image. For objects which appear distant, the difference in view from the approaches embodied in the first and alternative embodiments will be negligible. However, for objects which appear fairly close to the viewer, the offset optimal point of view may be noticeable.

It should also be understood that it is possible to use the alternative embodiment to generate stereoscopic images in which the camera axes of the two stereoscopic cameras are converged. However, doing so results in images in which the offset is typically more noticeable than when the camera axes are in parallel alignment.

FIG. 2F illustrates one example of the stereoscopic errors which typically result if the method and apparatus of the subject invention are not used, and instead, a simple linear transformation is applied to the original 2D camera animation curve 146, in order to generate two new camera animation curves 146', 146". These curves 146', 146" are applied to first new camera 176 and second new camera 178 having first and second camera points 180, 182 each having a particular orientation illustrated by first and second new camera direction vectors 184, 186, respectively.

Animation curve 146" is identical in shape to camera animation curve 146', but is shifted to the right in FIG. 2F through a simple linear transformation. As is clearly illustrated, if cameras 180, 182 followed their respective animation curves 146', 146", they would not maintain a fixed relative position and alignment between them. Instead, as illustrated, at the 'End' of the respective camera animation curves 146',146", second new camera 178 is the same distance to the right of the first new camera 176, in absolute terms, but has been shifted in relative terms to appear "in front" of the first camera 176 (in the direction of direction vector 184), thereby effectively preventing the generation of proper stereoscopic images.

As noted previously, in most instances it is preferable if the two stereoscopic cameras are fixed both regarding relative position and camera alignment with respect to each other, in order to stimulate a person's eyes travelling through the computer space. Simply transposing the original 2D camera animation curve to generate camera animation curves for two intended stereoscopic cameras can even result in the left camera moving to the right (in relative terms) of the right camera.

While the first and alternative embodiments of the subject invention have been illustrated and described as using previously generated 2D camera animation curve data and modelling data, it should be understood that the system and method may be used to generate stereoscopic animation sequences using all or only some of the 2D animation curve data and modelling data.

In some instances, utilizing the 2D camera animation curve data or the modelling data may create undesirable results. Accordingly, in those situations it may prove necessary for the computer graphics animator to modify certain "shots" or sequences slightly, either by modifying the modelling data or the stereoscopic camera animation curve paths for the two stereoscopic cameras. For example, in some scenes originally intended for 2D presentation, the computer graphics animator may insert a 2D backdrop of the sky, for example. While it may not be apparent in the 2D presentation that the sky is merely a 2D backdrop, when stereoscopic images are created, sometimes the illusion is pierced and the use of the backdrop becomes apparent, requiring correction by the computer graphics animator. As well, in a 2D animation sequence, the proximity of the 2D camera to objects in the scene is not of particular concern. For stereoscopic display, however, as would be understood by one skilled in the art, if the cameras are too close to an object, the resulting 3D image may create discomfort for the viewer. In such cases, entirely new animation curves for the stereoscopic cameras may need to be created by the computer graphics animator.

It should be understood that the size and shapes of the various cameras and nodes in FIGS. 2A–2F have been represented for illustrative purposes only. As noted previously, the cameras and nodes may exist merely as mathematical points having a particular orientation or direction.

It should also be understood that while the camera animation curve paths illustrated in FIGS. 2A–2F are relatively simple and continuous, existing in two dimensions only, typically the camera animation curves used to generate computer graphics animation sequences (for 2D or 3D presentation) are more complex, travelling in three dimensions throughout the virtual space, and may be discontinuous.

Furthermore, it should be understood that while the orientation (or alignment) of the cameras and nodes in FIGS. 2A–2F have been illustrated as being correlated to the general direction of movement as the camera or node follows its respective animation curve path, it should be understood that as long as the desired relationship between the relative positions of the cameras and the orientation of the camera axes (ie. parallel or converging) is maintained (in the case of two cameras), it should be understood that the axes of the cameras (illustrated by the camera direction vectors) need not be tangential to the respective camera animation curves.

Figure 5:
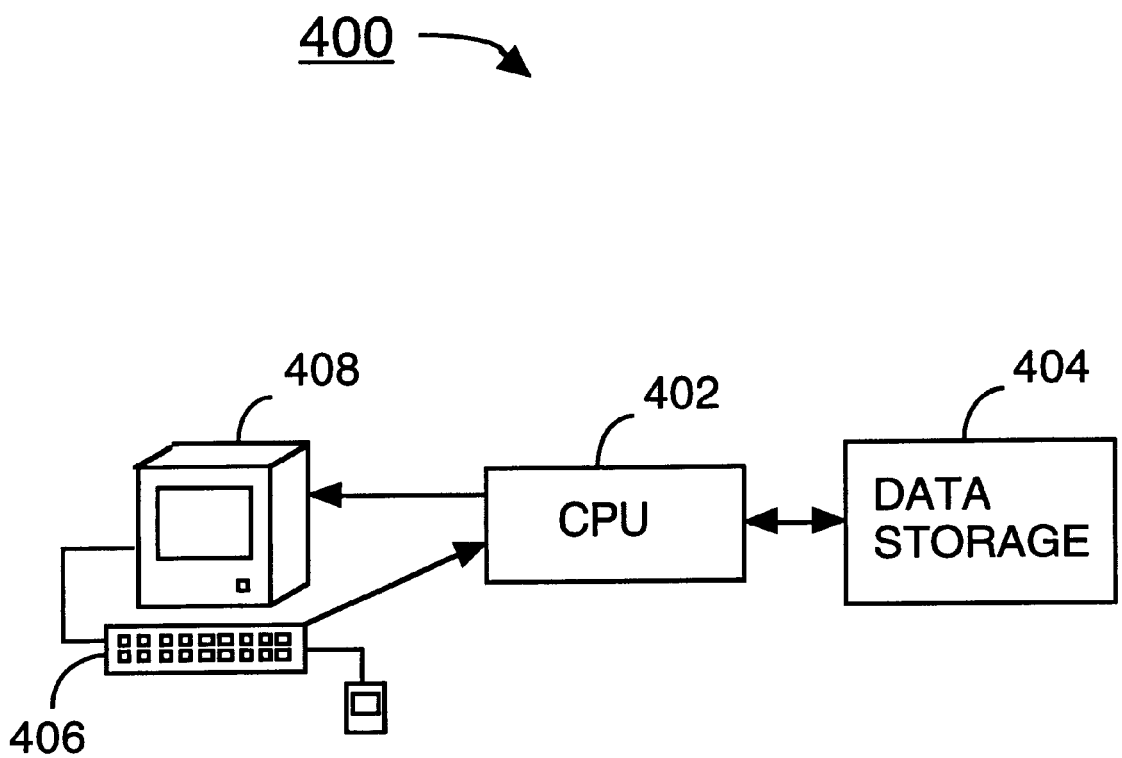
FIG. 5 is a schematic diagram of the components of a third embodiment of the subject invention.

FIG. 5 illustrates the system, shown generally as 400, which is capable of generating data with respect to a proposed animation sequence, in accordance with the subject invention. The system 400 comprises a suitably programmed processing unit 402, a data storage device 404, an input device 406, and an output device 408. The system 400 will preferably comprise a standard computer system having a suitably programmed central processing unit (CPU) 402, a data storage device 404, including RAM and ROM and long term storage, an input device 406, such as a standard computer keyboard and mouse, and an output device 408, such as a computer screen.

The parallax of a subject or object in a scene, is the difference in horizontal position of that subject with respect to the left and right stereoscopic cameras. For a stereoscopic pair of left and right cameras separated by a distance I, each having a lens of focal length F, the calculation for determining the parallax P of a subject is set out in the known equation E1:

$$P = 8FI(D - D_{conv})/(I^2 - 4D_{conv}D) \qquad \text{E1.}$$

In this equation, D is the distance from the pair of stereoscopic cameras, and $D_{conv}$ is the distance at which the stereoscopic cameras are converged, if camera convergence is being employed to generate stereoscopic images. In the modelled computer world, the units for measuring the distances of I, D and $D_{conv}$ are all in whatever arbitrary units the animator selected (eg graph units). From equation E1, it can be seen that as a result of division, all of the units for I, D and $D_{conv}$ in the numerator and denominator cancel out, leaving the units for F, the focal length. Accordingly, the units of parallax P, will correspond to the units for F.

In any camera system, focal length determines the angular field of view. This is illustrated by the known equation E2, in which W represents the dimension of the final image, and ø represents the field of view in which ø and W are measured in the same direction (ie. vertically or horizontally).

$$F = W/2 \tan(ø/2) \qquad \text{E2.}$$

In most computer graphics animation software applications, the field of view, ø, of the software camera being utilized by the application can be easily determined. From equation E2, it is apparent that the units of F will correspond to the units used to measure W. Thus, if the final destination of the stereo images are to be printed onto film, for example, and the units of the dimension of the film, W, are in millimeters (eg. 70 mm film), which is typically the case, then the focal length F will also be defined in millimeters.

Once the values for I, D and $D_{conv}$ have been determined with respect to a particular subject, the focal length F as calculated in equation E2 may also be substituted into equation E1 to determine what the parallax of the subject would be on film. Accordingly, the calculated parallax will also be in the same real world units as for the dimension of the image, W.

Since the magnification from film to the final viewing screen is a known quantity, the effect on the audience can be accurately calculated using this calculated parallax, and known stereoscopic equations. Utilizing the equations E1, E2 in this manner enables the automatic mapping of potentially arbitrary computer world modelling units into real world viewer space.

Preferably, the processing unit 402 of the system 400 will comprise a spreadsheet program for generating a spreadsheet 410 as illustrated in FIG. 6. The spreadsheet 410 has a set of cells 412–422, into which following values in computer modelling units taken from the computer model are entered: Camera Field of View 412 corresponding to the field of views of the left and right stereoscopic cameras, Camera Separation 414 corresponding to the distance between the left and right stereoscopic cameras, Convergence Distance 416, Prime Subject Distance 418 corresponding to the distance of the subject from the left and right stereoscopic cameras, Subject Size 420 corresponding to the size of the subject and Far Subject Distance 422 corresponding to the distance of the farthest visible object in the computer model, whenever convergence is smaller than infinity (ie. whenever the left and right cameras are converged and not in parallel alignment). If the left and right and right cameras are in parallel alignment (and not converged), very large values representing effective infinity (such as 1.00E+10) are entered into the Convergence Distance 416 and the Far Subject Distance 422 cells. The values entered into the set of cells 412–422 may be in any arbitrary, but internally consistent, modelling units (except for the Camera Field of View 412 cell, which is typically in degrees, or correlated units).

The spreadsheet 410 also has a set of cells 424, 426, in which the values in real world units (typically meters or feet) for Subject Theatre Distance 424 corresponding to the distance the subject will appear from the viewer, and Subject Theatre Size 426 corresponding to the size the subject will appear to the viewer, are calculated and displayed.

The formula used by the coil 424 to calculate the Subject Theatre Distance, $D_{theatre}$ is set out in equation E3.

$$D_{theatre} = (I_{viewer}/(I_{viewer} + MP - K))D_{screen} \qquad \text{E3.}$$

in which $I_{viewer}$ is the interocular distance between the viewer's eyes and K is the alignment constant representing the separation between the left and right eye images on the screen at infinity, as would be understood by one skilled in the art. The human average of 65 mm is typically used for this value. M is the magnification from film frame to theatre screen (approximately 350 times, in a large format theatre) and P is the film parallax calculated in accordance with equation E1, discussed above, $D_{screen}$ is the viewer's seating distance from the screen, and the distance for $D_{theatre}$ calculated through equation E3 is in the same units as used for $D_{screen}$ (since as discussed above, parallax, P, is typically calculated in millimeters, as is $I_{viewer}$).

The formula used by cell 426 to calculate the Subject Theatre Size, $S_{theatre}$, is set out in equation E4:

$$S_{theatre}=MS_{film}(D_{theatre}/D_{screen}) \quad \text{E4.}$$

in which $S_{film}$ is the size of the image on the film. The size of the image on film is a result of the distance from the subject to the camera and camera focal length, which will be the same for both the left and right images.

$S_{film}$ is calculated and substituted into equation E4, using the following equation E5:

$$S_{film}=F(S_{comp}/D_{comp}) \quad \text{E5.}$$

in which F is the focal length calculated previously, and $S_{comp}$ and $D_{comp}$ are the values of the size of the subject and the distance of the subject from the cameras, respectively, in computer modelling units. Since the modelling units cancel out from the numerator and the denominator in equation E5, $S_{film}$ will be in the same units as F (typically millimeters).

When convergence is used in generating stereoscopic images, any subject further from the camera than the convergence distance has its parallax reversed, with the right eye image moving to the right of the left eye. Since human eyes are not equipped with muscles that allow our eyes to rotate outward (diverge), there are limits to how much of this is allowed before the stereoscopic illusion will fail and cause discomfort for the viewer. The amount of this divergent parallax increases with distance.

The spreadsheet 410 is therefore provided with a cell 428 which calculates the divergent parallax, $P_{div}$, corresponding to the value in the Far Subject Distance Cell 422, using equation E1 in which $P_{div}$ is substituted for P, and the value in the Distance Cell 422 is submitted for D. The parallax value, $P_{div}$ calculated by cell 428 is used by the Far Subject Front Row Divergence Angle cell 430 to calculate the divergence or outward rotation angle, $\phi_{div}$, as seen by the person in the front row of the theatre (which is the worst case position), using equation E6:

$$\phi_{div}=2\text{atan}((MP-K)/2D_{close}) \quad \text{E6.}$$

in which $D_{close}$ is the closest distance anyone will be seated from the viewing screen. The value calculated by the spreadsheet 410 in the Far Subject Front Row Divergence Angle cell 430 should never exceed one degree, the accepted standard tolerance for divergence. If this value exceeds one degree, the computer animator will have to reconfigure either the positions of the left and right stereoscopic cameras in the scene, or manipulate the objects in the scene to ensure that this divergence angle is advanced to one degree or less.

Thus, while what is shown and described herein constitutes preferred embodiments of the subject invention, it should be understood that various changes can be made without departing from the subject invention, the scope of which is defined in the appended claims.

I claim:

1. A system for generating stereoscopic camera animation curve data from 2D camera animation curve data, comprising:
   (a) database means for storing modelling data and the 2D camera animation curve data; and
   (b) stereoscopic camera animation curve data generation means responsive to the 2D animation curve data, for generating stereoscopic camera animation curve data for stereoscopic cameras, comprising node generation means for generating a dummy node and for generating a first stereoscopic camera fixed in position relative to the dummy node and for generating a second stereoscopic camera fixed in position relative to the dummy node and separated from the first stereoscopic camera.

2. The system as defined in claim 1, wherein the node generation means is adapted to fix the first stereoscopic camera in alignment relative to the dummy node and to fix the second stereoscopic camera in alignment relative to the dummy node.

3. The system as defined in claim 2, wherein the dummy node is located equidistant between the first stereoscopic camera and the second stereoscopic camera.

4. The system as defined in claim 1, wherein the 2D camera animation curve data comprises data correlated to camera rotation.

5. A system for generating stereoscopic camera animation curve data from 2D camera animation curve data created for a 2D camera, comprising:
   (a) database means for storing modelling data and the 2D camera animation curve data; and
   (b) stereoscopic camera animation curve data generation means responsive to the 2D animation curve data, for generating a second stereoscopic camera fixed in position and alignment relative to the 2D camera and separated from the 2D camera and for generating second stereoscopic camera animation curve data.

6. The system as defined in claim 5, wherein the 2D camera animation curve data comprises data correlated to camera rotation.

7. A system for generating stereoscopic image data from animation data comprising modelling data and 2D camera animation curve data created for a 2D comprising:
   A. database means for storing the modelling data and the 2D camera animation curve data;
   (b) stereoscopic camera animation curve data generation means responsive to the animation curve data, for generating stereoscopic camera animation curve data for at least one stereoscopic camera fixed in position and alignment relative to the 2D camera; and
   (c) rendering means responsive to the stereoscopic camera animation curve data and responsive to modelling data for rendering stereoscopic image data.

8. The system as defined in claim 7, wherein the animation data also comprises 2D image data.

9. The system as defined in claim 7, wherein the 2D camera animation curve data comprises data correlated to camera rotation.

10. A method for generating stereoscopic camera animation curve data from 2D camera animation curve data, comprising the following steps:
    (a) generating a dummy node;
    (b) generating a first stereoscopic camera fixed in position and alignment relative to the dummy node;
    (c) generating a second stereoscopic camera fixed in position and alignment relative to the dummy node and separated from the first stereoscopic camera;

(d) applying the 2D animation curve data to the dummy node;

(e) generating first stereoscopic camera animation curve data correlated to the 2D animation curve data; and (f) generating second stereoscopic camera animation curve data correlated to the 2D animation curve data.

11. The method as defined in claim 10, wherein the 2D camera animation curve data comprises data correlated to camera rotation.

12. A method for generating stereoscopic camera animation curve data from 2D camera animation curve data created for a 2D camera, comprising the following steps:

(a) generating a second stereoscopic camera fixed in position and alignment relative to the 2D camera and separated from the 2D camera;

(b) applying the 2D animation curve data to the 2D camera; and (c) generating second stereoscopic camera animation curve data correlated to the 2D animation curve data.

13. The method as defined in claim 12, wherein the 2D camera animation curve data comprises data correlated to camera rotation.

14. A method for generating stereoscopic image data from animation data comprising modelling data and 2D camera animation curve data, comprising the following steps:

(a) generating a dummy node;

(b) generating a first stereoscopic camera fixed in position and alignment relative to the dummy node;

(c) generating a second stereoscopic camera fixed in position and alignment relative to the dummy node and separated from the first stereoscopic camera;

(d) applying the 2D animation curve data to the dummy node;

(e) generating first stereoscopic camera animation curve data correlated to the 2D animation curve data;

(f) generating second stereoscopic camera animation curve data correlated to the 2D animation curve data;

(g) rendering first stereoscopic image data correlated to the first stereoscopic camera animation curve data and to the modelling data; and (h) rendering second stereoscopic image data correlated to the second stereoscopic camera animation curve data and to the modelling data.

15. The method as defined in claim 14, comprising inputting first camera characteristic data and second camera characteristic data.

16. The system as defined in claim 14, wherein the 2D camera animation curve data comprises data correlated to camera rotation.

17. A system for determining attributes of a stereoscopic image to be generated using modelling data and a first stereoscopic camera and a second stereoscopic camera, comprising:

(a) an input device;

(b) processing means capable of receiving measured data from the input device correlated to measurements in arbitrary but internally consistent modelling units taken from the modelling data and the position of the first and second stereoscopic cameras, for calculating attribute data correlated to attributes of the stereoscopic image in real world units; and (c) an output device operationally coupled to the processing means for displaying the attribute data.

* * * * *